United States Patent
Srinivasan et al.

(10) Patent No.: US 7,747,465 B2
(45) Date of Patent: Jun. 29, 2010

(54) DETERMINING THE EFFECTIVENESS OF INTERNET ADVERTISING

(75) Inventors: Kannan Srinivasan, Gibsonia, PA (US); Michael I. Shamos, Pittsburgh, PA (US)

(73) Assignee: Intellions, Inc., Mars, PA (US)

( * ) Notice: Subject to any disclaimer, the term of this patent is extended or adjusted under 35 U.S.C. 154(b) by 884 days.

(21) Appl. No.: 09/804,735

(22) Filed: Mar. 13, 2001

(65) Prior Publication Data

US 2002/0042738 A1    Apr. 11, 2002

Related U.S. Application Data

(60) Provisional application No. 60/188,889, filed on Mar. 13, 2000.

(51) Int. Cl.
*G06Q 30/00* (2006.01)
(52) U.S. Cl. .............. 705/14.4; 705/14.1; 705/10; 705/26; 705/400; 709/217
(58) Field of Classification Search ............ 705/14, 705/14.4, 14.1, 26, 10, 400
See application file for complete search history.

(56) References Cited

U.S. PATENT DOCUMENTS

| | | | |
|---|---|---|---|
| 5,848,396 A * | 12/1998 | Gerace | 705/10 |
| 5,918,014 A * | 6/1999 | Robinson | 709/219 |
| 6,085,229 A * | 7/2000 | Newman et al. | 709/203 |
| 6,286,005 B1 * | 9/2001 | Cannon | 707/100 |
| 6,338,066 B1 * | 1/2002 | Martin et al. | 707/10 |
| 6,356,879 B2 * | 3/2002 | Aggarwal et al. | 705/26 |
| 6,430,539 B1 * | 8/2002 | Lazarus et al. | 705/10 |
| 6,567,786 B1 * | 5/2003 | Bibelnieks et al. | 705/14 |
| 7,031,932 B1 * | 4/2006 | Lipsky et al. | 705/14 |

FOREIGN PATENT DOCUMENTS

WO    WO 97/41673    * 11/1997
WO    WO 0148666 A1  * 7/2001

OTHER PUBLICATIONS

Tapiero, C.S., "On-line and adaptive optimum advertising control by a diffusion approximation" : Operations Research, vol. 23, No. 5, pp. 890-907: Sep.-Oct. 1975.*

* cited by examiner

*Primary Examiner*—Jean Janvier

(57) ABSTRACT

The method and system of the present invention enables Internet businesses to conduct real-time, online experiments on a sample of transactions to determine marketplace sensitivities. Analysis of the results of the experiments reveal optimal values of key market decision variables such as price, content of banner ads, promotion levels, quantity discount schemes, etc. The experiments may be automatically conducted on an on-going basis, or may be conducted on a periodic basis. The method and system of the present invention preferably allow users to modify the nature of the experiment and the propagation of optimal values. The method and system of the current invention can be used for a pure diagnostic purpose or to automate the setting of key market variables.

The dynamic experimentation used by the inventive system reveals the relative stability (or instability) of the networked market within which the business operates. The translation of an optimal value for a key variable (for example, content of a banner ad) to the entire market can be done on a real-time basis.

20 Claims, 4 Drawing Sheets

DETERMINING THE EFFECTIVENESS OF INTERNET ADVERTISING

CROSS-REFERENCE TO RELATED APPLICATIONS

This invention relates to U.S. Provisional Application No. 60/188,889, filed Mar. 13, 2000, which is incorporated by reference herein in its entirety.

FEDERALLY SPONSORED RESEARCH

Not Applicable.

BACKGROUND OF THE INVENTION

1. Field of the Invention

The disclosed invention relates to determining the effectiveness of various forms and formats of advertising on the Internet through controlled online experiments.

2. Description of the Background

In traditional commerce, prices are typically static, with change only occurring with major market changes. This has resulted in part because the costs associated with printing fixed-price catalogs, marking goods with prices and advertising prices in the media. Furthermore, it is difficult to offer different prices to different purchasers in a traditional setting in which prices are published or made publicly available.

In addition, advertising campaigns are typically conducted for a substantial period of time before they are updated or changed.

However, e-commerce does not have to be so restricted. The introduction of e-commerce on the Internet has made it easier for Internet merchants to change prices and other market variables by simply updating a Web page or appropriate database/systems. The costs associated with printing catalogs and marking goods in a bricks-and-mortar setting are typically not present in eCommerce. In addition, it is also possible to offer different prices to different customers without either customer learning the price that has been offered to the other. Likewise, it is possible to simultaneous present different advertising campaigns to different Internet customers.

Although it is possible for Internet merchants to update or change advertising and other market variables at any time, typically they have not done so. One reason for sticking to static marketing strategies is that merchants are accustomed to keeping a static advertising campaign. In some cases, merchants have both brick-and-mortar shops and Web shops, and want to keep prices and advertisements in alignment. However, the primary reason why Internet merchants do not dynamically adjust market variables with the ever-changing marketplace is that the merchants do not have the ability to dynamically determine optimal values for the market variables.

In particular, Internet customers may be presented with multiple forms of advertising matter, including graphics, animations, text, audio and video. Such advertising is generally "hot" in the sense that the advertisement itself can be clicked on via a computer mouse or the like, and the user's web browser is redirected to the advertiser's site. Because of this, each such event (or absence thereof) may be tracked and measured. However, very few methods of analyzing any such data exist. Therefore, it is typically not known which forms of advertising or its features, such as color, size, or placement with respect to other matter on a webpage, are most effective in capturing the user's attention. Furthermore, it is possible that such effective may vary with time, culture, socioeconomic status, language, time of day, etc. Additionally, websites undergo frequent updates, and an advertisement that was attention-grabbing on one day may not be so striking after the webpage is updated to a different background color, for example.

The Internet is a dynamic marketplace. As e-commerce becomes a dominant force, the ability to dynamically adjust to and exploit changes in the Internet marketplace becomes critical. An enormous amount of detailed, disaggregate information is being routinely captured during Internet transactions. The ability to gather real-time information on transactions conducted on the Internet means that Internet merchants could use the information to dynamically update their websites to take maximum advantage of market conditions. In particular, real-time transaction information opens up the possibility of dynamic pricing and marketing.

However, using the information to determine the dynamic, optimal market value is problematic. Although a great deal of real-time transactional information is available, businesses have no current method of being able to analyze the information in a manner that provides guidance to dynamically updating pricing, marketing, promotions and other key market variables.

As enterprises move into high velocity environments in a networked economy, decisions based on data are ever more critical and can be leveraged to affect the bottom line. In this environment, information is highly valuable but comes with a high discount rate. That is, the value of the information rapidly depreciates. Current generation data analysis and data mining methods do not effectively deal with this type of information, as current methods rely on a time-consuming sequential process of data gathering, analysis, implementation and feedback.

Current systems including data mining methodologies are retrospective, and there is a significant lag in analysis time. The dynamic nature of the Internet makes even recent information obsolete.

Some efforts have been made to use computer systems to estimate supply and demand, to adjust prices to perceived market conditions, or to vary prices based on the identity and purchasing history of the customer.

U.S. Pat. No. 5,752,238 discloses a consumer-driven electronic information pricing mechanism including a pricing modulator and pricing interface contained with a client system. However, in this reference, the customer selects from a menu of pricing options. It does not disclose or teach a real-time determination of price sensitivities.

U.S. Pat. Nos. 5,822,736 and 5,987,425 disclose a variable margin pricing system and method that generates retail prices based on customer price sensitivity in which products are grouped into pools from a first pool for the most price sensitive products to a last pool for the least price sensitive products. However, the price sensitivities are determined manually by the storekeeper based on his subjective impressions and are not obtained in real-time.

U.S. Pat. No. 5,878,400 discloses a method and apparatus for computing a price to be offered to an organization based on the identity of the organization and the product sought, but does not teach or suggest real-time price determination.

U.S. Pat. No. 5,918,209 discloses a method and system for determining marginal values for perishable resources expiring at a future time, such as an airline seat, hotel room night, or rental car day for use in a perishable resource revenue management system. Data for the perishable resources and composite resources is loaded from the perishable resource revenue management system into the marginal value system. The marginal values for the perishable resources are determined using a continuous optimization function using interdependencies among the perishable resources and the composite resources in the internal data structures. However, this reference does not disclose or teach elicitation of price sensitivities based on measuring customer behavior.

U.S. Pat. No. 5,926,817 discloses a client-server system and method for providing real-time access to a variety of database systems, one application of which is "dynamic price quoting." However, the reference uses this phrase to mean computing a single price to be quoted to a customer based on information about the user's requirements and data contained in the supplier's databases. It does not teach or suggest experimentation to determine marketplace customer price sensitivity.

In general, the prior art teaches that it is useful to attempt to measure supply and demand as an aid in determining prices. It is also known to utilize previously accumulated facts about a purchaser to influence the price at which a particular product should be offered to him. However, the applicants are not aware of any prior art in which price and other market sensitivities are measured directly through use of controlled real-time experiments.

It is common in the advertising world to conduct surveys to determine the effectiveness of various advertising campaigns. However, because of the speed at which Internet content is generated and modified, it is impractical to conduct human-mediated consumer preference surveys. It might be feasible to do so prior to airing an expensive television commercial, but it is not cost or time effective for webpage advertising.

It is also common for websites to closely monitor "click-through." Click-through is the number of times users arrive at a site by having clicked on an advertisement. This information is utilized to learn how well an advertisement draws an audience. However, it is not known or suggested in the prior art to measure the effectiveness of advertising by presenting different forms of the same advertisement to selected random samples of the population and measuring relative draw.

In view of the foregoing, it can be appreciated that a substantial need exists for a method and system for dynamically determining the effectiveness of various advertisements.

SUMMARY OF THE INVENTION

The inability to effectively exploit Internet transaction information is overcome by the method and system of the present invention, which enables Internet businesses to conduct real-time, online experiments on a sample of transactions and determine marketplace sensitivities. Analysis of the results of the experiments reveal optimal values of key market decision variables such as price, content of banner ads, promotion levels, quantity discount schemes, etc. The experiments may be automatically conducted on an on-going basis, or may be conducted on a periodic basis. The system offers total flexibility to the users to conduct and control the experiments. The experimental process is based upon rigorous statistical and econometric principles.

A manager using the method and system of the present invention can control the extent and speed with which market strategies are updated. The method and system of the present invention preferably allow managers to modify the nature of the experiment and the propagation of optimal values. Managers make the key business decisions, which are silently and seamlessly translated into the Internet merchant's eCommerce system.

The dynamic experimentation used by the inventive system reveals the relative stability (or instability) of the networked market within which the business operates. The translation of an optimal value for a key variable (for example, price) to the entire market can be done on a real-time basis.

Continuous real-time modeling with appropriate integration to existing systems on critical factors like price, promotion, financing, content, advertising formats, discount schemes and product bundling give companies using the method and system of the present invention a huge competitive advantage.

In particular, the present invention is directed to a method and computer-programmed apparatus for determining advertising effectiveness through controlled statistical experiments. Different viewers of a webpage are presented with different formats of the same advertisement and statistics are kept on the audience response to each format in real-time. The information so gathered may be subjected to statistical analysis to determine which format is most effective for a particular segment of the marketplace. The webserver may be adaptively modified to present a higher fraction of formats found to be effective by the experiment. The experimentation can take place continuously so that audience trends and preferences are not missed.

One embodiment of the invention comprises a method of dynamically determining an optimal advertisement to be used by an Internet merchant, comprising the steps of: receiving configuration data from the Internet merchant; randomly sampling visitors to the Internet website according to the configuration data; determining an optimal advertisement using the acquired data; and thereafter using the determined optimal advertisement.

Another embodiment of the invention comprises a method of dynamically determining an optimal advertisement to be used by an Internet merchant, comprising receiving configuration data from the Internet merchant; randomly sampling visitors to the Internet website according to the configuration data; determining a measurement for each advertisement using the acquired data acquired; thereafter using the determined optimal advertisement; and repeating the above process using the determinations as configuration data in future iterations of the experiments.

It is a benefit of the present invention that the effectiveness of Internet advertising can be improved by automated experimentation and measurement.

It is a benefit of the present invention that changing market and user preference for advertising and the products advertised may be monitored continuously and varied continuously to maximize economic benefit and/or user satisfaction.

With these and other advantages and features of the invention that will become hereinafter apparent, the nature of the invention may be more clearly understood by reference to the following detailed description of the invention, to the appended claims and to the several drawings attached herein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the embodiments of the invention, examples of which are illustrated in the accompanying drawings. Wherever possible, the same reference numbers will be used throughout the drawings to refer to the same or like components.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

By determining the effectiveness of various proposed advertisements, an Internet merchant can update his advertising campaign in real-time to realize maximum advertising effectiveness.

The method and system of the present invention utilize limited sampling to determine real-time market sensitivity. This sampling provides data that can be used to create a real-time model that is analyzed to determine optimal values for many key market variables, such as price, promotions, advertising content and product bundling. The method and system of the present invention allow for customized dynamic advertising.

The method and system of the present invention enables a company using the system to present different advertisements to different customers. The method and system of the present invention may be used to segment the market, and managers using the system of the present invention may be informed of an optimal advertisement for each market segment.

Architecture

Figure 1:
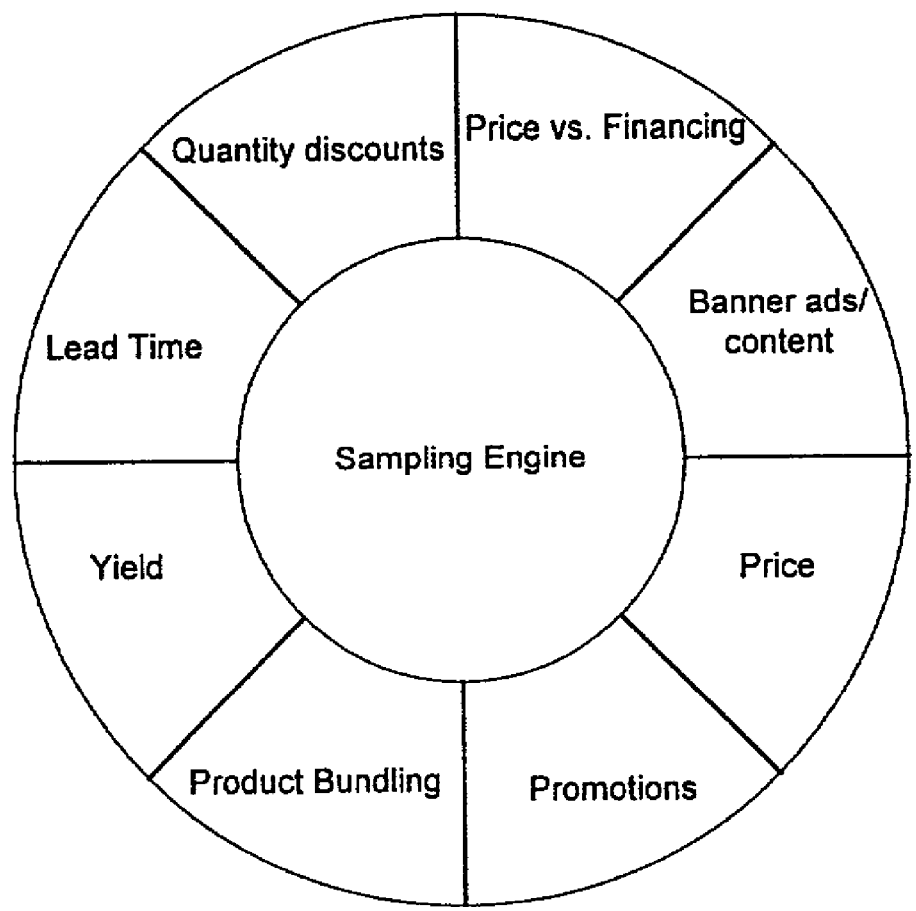
FIG. 1 is a diagram illustrating the relationship between the sampling engine of the present invention and various applications that use the sampling engine.
Figure 2:
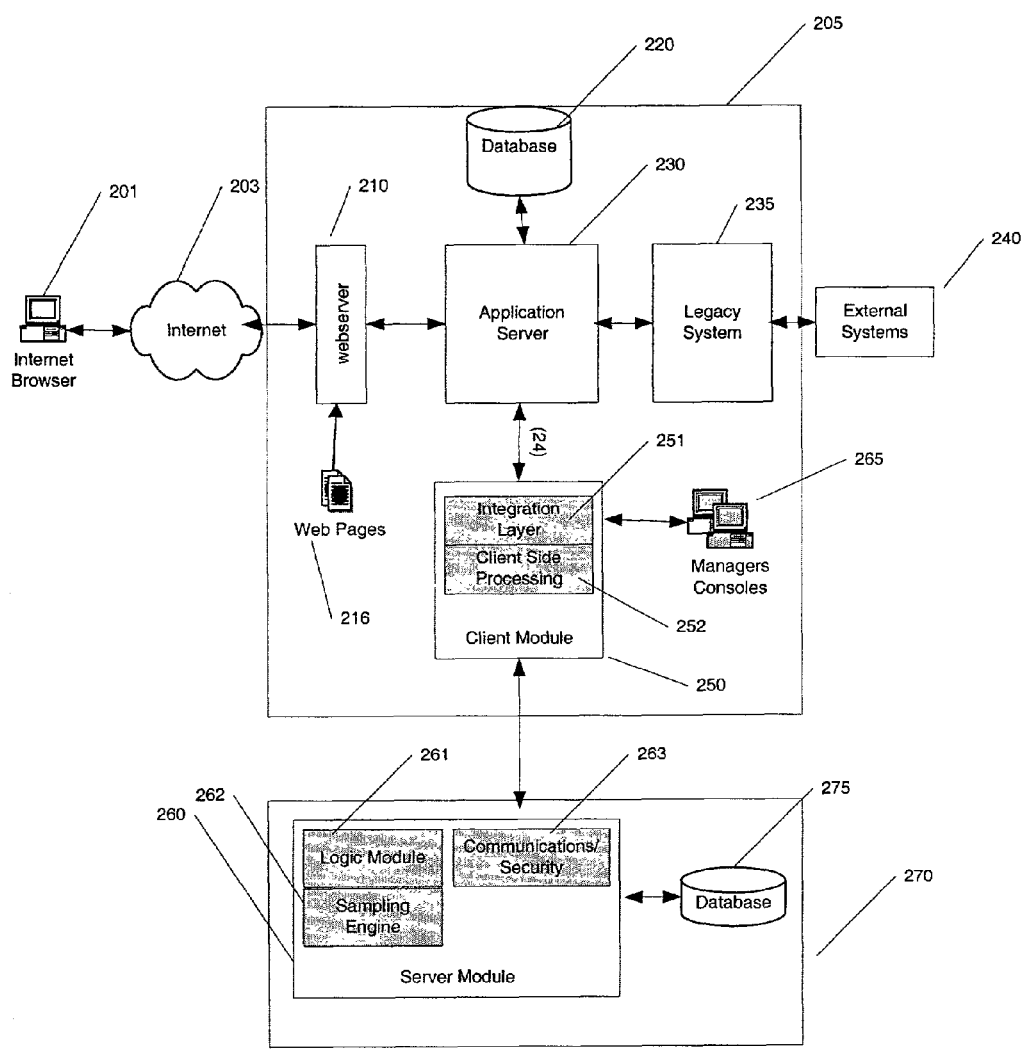
FIG. 2 illustrates one embodiment of a system architecture that may be used by the method and system of the present invention.

FIG. 2 illustrates one embodiment of a system architecture for the system of the present invention. In this embodiment, a potential customer visits a website run by an Internet merchant and conducts eCommerce by purchasing one or more products from the Internet merchant through the website.

In the embodiment shown, the customer uses an Internet browser 201 on his computer to access an eCommerce site operated by an Internet merchant, such as Amazon.com. The Internet browser 201 may be any known to those skilled in the art, such as Microsoft Explorer or Netscape Communicator, for example. Preferably, HyperText Transfer Protocol (HTTP) or its more secure version HTTPS is used to communicate with the website. These are popular communication protocols used on the Internet to exchange information. Other communication protocols are known to those skilled in the art, and are intended to come within the scope of the present invention.

In an alternative embodiment not shown, the customer may be using a wireless handheld device to access the website.

Once the customer has accessed the eCommerce website, he may receive information such as banner advertisement or similar ad content from the website. The request sent by the browser might include information specific to the customer using the browser. Such information may include, for example, information derived from user logins, cookies stored on the user's machine and through the user's IP address. In addition, the customer may be presented with advertisements, and whether the customer clicks on any of the advertisements may be passed from the browser to the website with the request.

The customer's browser 201 communicates with an Internet merchant's eCommerce system 205. The eCommerce system 205 is an integrated system that comprises different kinds of hardware and software sub-systems. The eCommerce system performs the functions needed to run the Internet merchant's Website.

Webservers are usually the entry point into an eCommerce system 205 from the perspective of a software program. The Webserver 210 on the eCommerce system is mainly responsible for delivering webpages to a browser across the Internet. Webpages are the pages that the user sees in the browser. The Webserver 210 runs software that receives and processes requests for webpages from users. The webpages may be stored as files on a storage disk that the Webserver reads and sends to the requesting browser. This is shown by 216. Alternatively, Webserver 210 may generate the webpage by gathering information from other sources, such as software programs, and then send it to the browser. For example, Webpages are often generated with data retrieved from an Application Server. In particular, the Application Server may determine content and/or formats for an Internet advertisement.

The Webserver 210 may be any type of known webserver, such as Microsoft IIS, or Netscape NES. The architecture shown in FIG. 2 also shows optional database 220. The database may be used by the eCommerce system 205 to store Internet merchant information, such as customer account records. Database 220 may be any known database type, such as Oracle, Sybase, DB2, etc.

In addition, the Internet merchant may have one or more Legacy Systems 235. For example, all customer data may be stored on a Legacy System.

In many cases eCommerce systems interact with external systems, as shown by 240. For example, a trading exchange may receive catalogs from several external systems and store them in its own system. It may then present items from the catalogs to interested buyers. The eCommerce system 205 may communicate with external systems over the Internet or through a dedicated Frame Relay Circuit, or any other type of connection mechanism.

Because Webservers usually do not perform business logic data processing, the architecture typically includes an Application Server 230. The Application Server 230 may perform most business specific logic operations and send data to the Webserver, which processes the data and sends formatted output to the user for display. For example, the Application Server may retrieve a customer's bank account information, which is used as part of an Order Confirmation webpage generated by the Webserver.

Interprocess communications between the Application Server and the Webserver are typically supported by the underlying operating system. For example, for JAVA based platforms, the communication protocol may be RMI/IIOP (Remote Method Invocation/Internet Inter-ORB Protocol). The programs communicating via these methods may or may not reside on the same physical computer. Similar methods may be used for the communications between the Application Server and the Client Module, which is described below.

Communications between a Legacy System and Application Server may be accomplished using commercially available software, such as IBM's MQ, Microsoft's MSMQ or Tibco software. The software used depends on the needs and the underlying operating systems.

The manager's console 265 contains software similar to browser software for displaying output from the inventive system to an employee of the Internet merchant, typically a management-level employee. It is used to manage the experiments run by the inventive system. It is used to configure experiments and display run-time progress data on the experiment. It may also be used to display data on past experiments.

The client module 250 of the present invention is integrated in the eCommerce system 205. Client Module 250 typically consists of an Integration Layer 251 and a Client Side Processing module 252. Collectively, it takes as input experiment parameter values and sends them to the Server Module 260 for processing. It receives output from the Server Module 260, and disseminates the output to the Application Server 230 and/or the Manager's Console 265 for display.

The Client Side Processing Module 252 is responsible for processing all the input received from the eCommerce System, typically through the Application Server 230, and delivering it to the Server Module 260. The input is typically a continuous stream of parameters used to conduct and manage an ongoing experiment. The Client Processing Module 252 establishes and maintains a secure communication channel with the Server Module and may also perform session management.

The Integration layer 251 helps the Client Side Processing module 252 run on a variety of systems. It acts as an interpreter between the eCommerce System and the Client Side Processing module 252. It may be different for different systems. This enables the Client Side Processing module 252 to remain the same, no matter what type of operating system is being used. In an alternative embodiment, the Client Side Processing module may be developed for a specific eCommerce system and runs without an Integration Layer.

Communications between the Client Module 250 and the Server Module 260 typically use HTTPS to ensure security. Data may be transmitted in eXtensible Markup Language (XML) format.

The Dynamic Advertising System 270 includes sub-systems, computers and communications systems, including Server Module 260, that are used to perform the sampling and resultant analysis. It receives input data, performs statistical calculations and feeds the output to the eCommerce system 205. Typically, the output from the Dynamic Advertising System 270 is used by the Application Server 230 in performing the business specific logic.

Server Module 260 may contain Logic Module 261, Sampling Engine 262 and Communications Module 263. Server Module 260 is responsible for receiving input from Client Module 250, performing the experimentation and analysis, and outputting results to Client Module 250. These actions are all performed in a secure environment.

Sampling Engine 262 contains statistical functionality that performs the various experiments. Logic Module 261 contains the algorithms that are used to perform various types of analyses on the sampled data.

The Communications module 263 is responsible for securely communicating data to and from the Client Module.

Database 275 may be used to store historical data and other data regarding the experiments for processing, report generation and future retrieval.

The architecture shown in FIG. 2 is an ASP-based solution, where the Server Module 270 is hosted on a remote system with a network connection to the eCommerce system 205. In an alternative embodiment, the Dynamic Advertising System 270 may reside within the eCommerce system 205.

Figure 3:
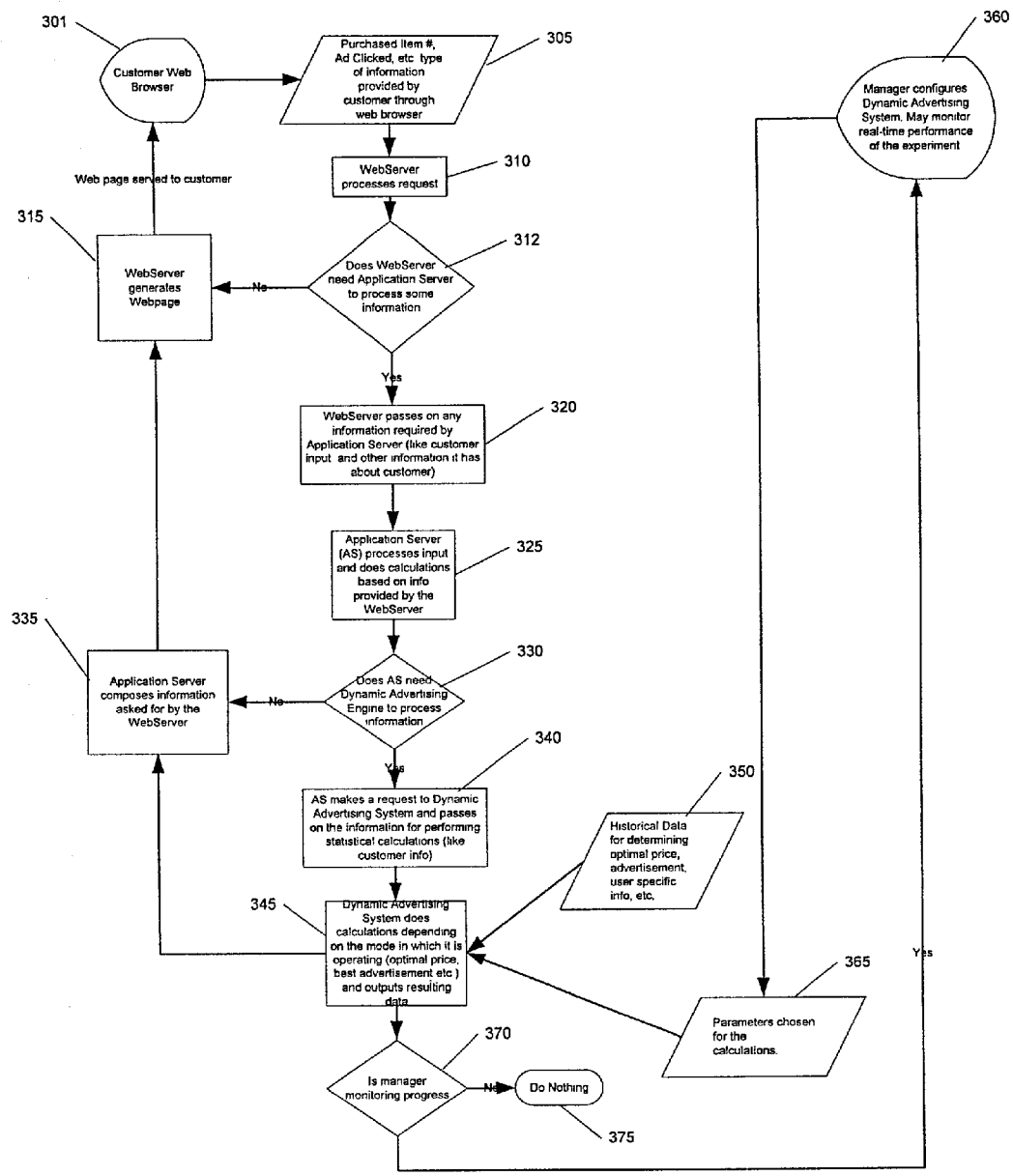
FIG. 3 illustrates one embodiment of software system data flow in the method and system of the present invention.

FIG. 3 illustrates how data may flow through the inventive system.

As shown by entity 360, a management-level employee for the Internet merchant using the inventive system configures the Dynamic Advertising System with parameters. For example, the employee may enter the types of advertisements and number of samples to be used in the experiments. The employee may also actively monitor the performance of the experiment(s).

These parameters are used as input into the Dynamic Advertising System as shown by data 365. These parameters configure the sampling engine subsystem of the Dynamic Advertising System.

As shown by entity 301, a customer uses a browser to access an eCommerce website. When the customer click on an advertisement or makes a request, several different types of data items may be sent to the Webserver, as shown by 305. The Webserver processes the information at step 310. If the request from the customer does not require Application Server processing, then the Webserver can go ahead and generate the appropriate standard Webpage, as shown by steps 312-315. However, if additional processing is needed, the Webserver will pass on information to the Application Server at step 320. Based on the information provided by the Webserver, the Application Server processes the input and performs any needed calculations at step 325.

During step 325, the Application Server will determine whether it needs the Dynamic Advertising System to process data. For example, there may be a current ongoing experiment to determine the optimal price or optimal advertising content, etc.

If the Application Server does not need the Dynamic Advertising System to process information, it composes the requested information using input from its own calculations, databases and/or legacy systems, as shown by steps 330-335.

Otherwise, the Application Server makes a request to the Dynamic Advertising System and passes on any information required by the Dynamic Advertising System for performing the statistical calculations, as shown by step 340.

The Dynamic Advertising System may use historical data in its calculations as shown by data 350. In addition, the parameters 365 entered by the Internet Merchant are used in the calculations that the Dynamic Advertising System performs.

The Dynamic Advertising System performs the calculations as required, and outputs the resulting data at step 345. The Application Server composes the requested information at step 335 using the output from 345.

If the manager is actively monitoring the progress of the experiment, he will be informed of the progress as shown by steps 370-360.

The sampling engine 262 of the Dynamic Advertising System may be used by many different applications to obtain information about current market conditions. These applications use the sampling data to determine optimal pricing, promotions, product bundling, lead time discounts, quantity discounts, price versus financing and type and content of banner ads, for example. The Logic Module contains the algorithms to perform the different types of analyses required by different applications. Other applications of the sampling data will be known to those skilled in the art and are intended to come within the scope of the present invention.

The dynamic sampling engine is the core of the inventive system. As shown by FIG. 5, it can be translated into modules for pricing, promotions, product bundling, yield management, lead time discounts, quantity discounts, price versus financing and banner advertisement content.

The banner advertisement content module is the focus of this application and is described below.

Dynamic Advertisement Content

It is easy to change the content and/or format of Internet advertisements. In addition, it is possible to present different advertisements to different online visitors without either visitor learning that a different advertisement has been offered to the other. This may be accomplished by presenting different versions of a banner ad to different potential customers, for example. Because of these reasons, it is possible to perform controlled, real-time experiments on random samples of the visitors to determine marketing sensitivities. This information can then be used to determine real-time optimal marketing strategies for an entire population or for selected segments of the population. In addition, merchants may learn from the online experiments, and apply this learning to offline counterpart market strategies.

The sampling experiments conducted by the method and system of the present invention are designed to measure reactions to various advertisements. In the present application, the content and/or form of advertisements are deliberately varied by the inventive system during a sampling period, and statistics are kept by the system to determine what percentage of visitors are likely to exhibit interest in each of the different advertisements. The statistics typically include, for example, the number of visitors who actually click-through each advertisement.

Given the percentage of visitors who exhibit a quantifiable interest in each advertisement, the system is able to determine the effectiveness of the advertisements. The effectiveness determined by the system is a measure of the real-time effectiveness of the various advertisements, as the data used to determine effectiveness is dynamically collected.

In one embodiment, the inventive system uses one or more objective functions for determining advertising effectiveness. As discussed above, the objective function may be to maximize the click-through rate. Another example of an objective function is the buy-rate, or the percentage of visitors to a website that not only click-through the advertisement, but actually buy the advertised product. Other methods of measuring effectiveness of advertising are known to those skilled in the art, and are intended to come within the scope of the present invention.

The objective function may weigh multiple criterions. For example, the Internet merchant may be trying to optimize both click-through rate and buy-rate. The buy-rate may indicate a signup rate, for example. The objective function may be defined to be 75% weighted toward click-through rate optimization and 25% toward buy-rate optimization. The inventive system in this case will determine which advertisement optimizes this weighted multi-criterion function.

In another embodiment, the objective function may be a combination of factors. For example, the objective function could be to meet a minimum click-through rate as well as a minimum buy-rate.

The inventive system allows companies to determine optimal advertising strategies by running continuous real-time models on an appropriate sample population, which may be determined automatically by the sampling engine.

Based on the objective, the effectiveness of various advertisements is calculated, and the system suggests the optimal advertisement for the current market conditions.

Figure 4:
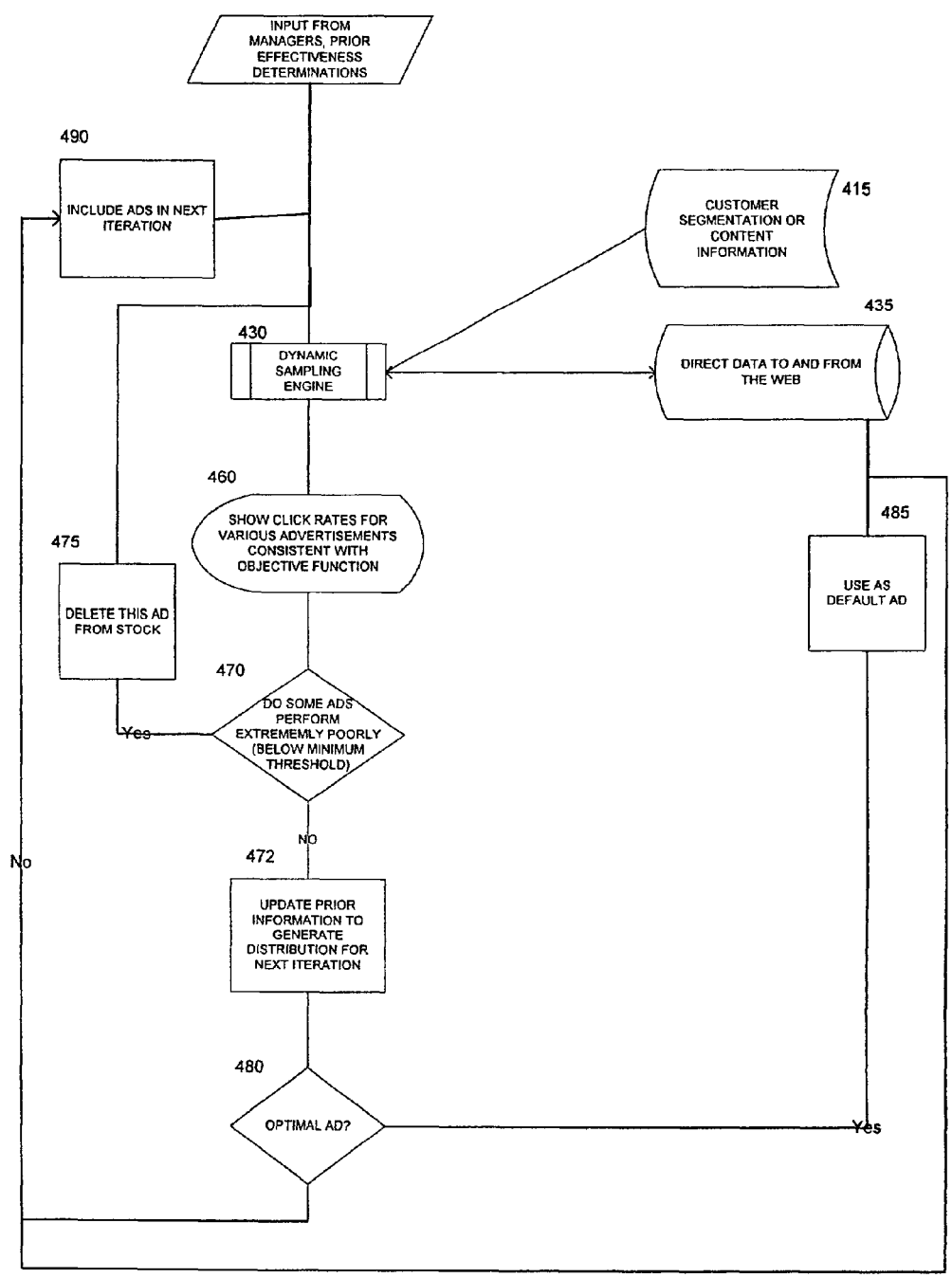
FIG. 4 is a flowchart illustrating the process used to measure Internet advertising effectiveness by the method and system of the present invention.

FIG. 4 illustrates an overall procedure for determining an optimal advertisement. As shown in step 410, an employee for the Internet merchant first inputs data that is used by the inventive system to determine a sampling and optimization strategy. The employee is typically a manager-level employee for an Internet merchant. In this step, the various advertisements, or different formats of the same advertisement are first identified. These ads may come from an ad agency, or may be developed by the Internet merchant.

In one embodiment, the ads used in the inventive system are different variations of the same ad. That is, an advertisement that may be parameterized according to some variable, such as size, location, speed of animation, color, audio volume or similar measure. In this embodiment, different ads may be generated by substituting different ad formats into HTML files, said ads being draw from a database or dynamically generated based on the chosen parameters. Alternative, instead of parameterizing, the formats of the advertisements may be chosen from a given finite set.

The system may conduct experiments to determine the effectiveness of new advertisements, or may conduct experiments to determine whether ads currently in use are still effective. Therefore, if any knowledge currently exists about which ads are currently believed to be more effective, this information is also gathered. The system may take into account this effectiveness when determining how the advertisements are offered in the experiment. This portion of the process will be described in more detail below.

The system may restrict the input in several ways. For example, the inventive system may require a minimum number of advertisements. As another example, a minimum click-through rate for an advertisement may be specified. In this case, if during the experiment a particular advertisement does not achieve a minimum click-through rate, it may be deleted from further consideration.

The Internet merchant employee may specify whether the system is to conduct continuous sampling, or sample at large discrete intervals.

The number of website visitors to sample for each advertisement is also determined. This may be an absolute number of visitors to be randomly presented with each advertisement. Alternatively, a time interval over which testing is to be performed may be defined, and the visitors who visit the website during that period become the population. Appropriate random samples drawn from this population will be exposed to different ads.

In either embodiment, it may be possible that during the accumulation of data it will become apparent prior to the end of the time period or before the absolute number of customers are sampled that a particular advertisement is optimal. In this case, since it is not necessary to continue the experiment to its normal completion, the sampling may be stopped. In addition, it may be possible to determine before the entire population is sampled that a particular advertisement is not minimally effective. In this case, the ad may be dropped from the experiment.

This input determines the sampling plan to be used for measuring advertisement effectiveness, including what percentage of visitors are to be presented with each format of ad and length of time the experiment is to continue.

Given the number of advertisements and any prior effectiveness rating, the advertisements are randomly presented to website visitors during the course of the experiment. For example, if a website is estimated to have 100,000 visitors in a day, and there are 5 ads in the experiment, the system may evenly divide the ads such that each ad is presented to 20,000 visitors. Alternatively, if a particular ad has been previously determined to be particularly effective, it may be shown to 80,000 visitors, and the other 4 ads presented to the remaining 20,000 visitors. Different methods of propagating the distribution determined by the inventive system are described in more detail below.

In one embodiment, the population may include every potential customer that visits the website. Alternatively, the population may be clustered or segmented, and only visitors that meet a certain profile are considered to be within the population. For example, only visitors that have never bought from the Internet merchant may be sampled. As another example, visitors may be clustered into socioeconomic groups, and only certain groups are sampled when determining an optimal advertisement. In this case, the population may be segmented according to one or more variables, such as income, zip code, profession, previous buying history or the like. Alternatively, the entire population may be segmented, with separate experiments run on each segment determining an optimal advertisement for each segment. As another example, visitors may be identified for sampling based upon prior purchasing history or other accumulated data. Segments may be determined from these demographic variables and/or from prior purchase histories. To apply segmentation, each visitor is categorized as to population segment prior to being shown an advertisement.

In one embodiment the same ad formats are presented to all segments, but the effectiveness is measured separately for each segment. In an alternative embodiment, different ads are presented to different segments.

Information used to determine segmenting, or to determine which visitors to include in the sample population, may come from outside sources, as shown by data storage 415.

During the sampling process, the dynamic sampling engine 430 randomly samples potential visitors according the parameters defined at 410. To accomplish this sampling, the Webserver randomly distributes webpages 435 with the different advertisements to the different visitors in proportion to the distribution determined in step 410.

Data is accumulated for each advertisement. This data typically include the fraction of visitors who click-through a particular ad, for example. Other data may include whether or not the customer purchased a particular product or a minimum "basket" of products.

This process is repeated until sufficient information for each advertisement has been obtained. If the population has been segmented, the sampling continues until the objective function can be estimated for each segment.

Once a first set of relevant information has been determined, the information is displayed to the manager at 460. The ad with the highest click-rate, or other measurement of the objective function, is then used as the default advertisement, and propagated to the entire population except any sample or samples subject to experimentation with other advertising formats, as shown by 485.

The embodiment shown in FIG. 4 uses cumulative sampling. That is, it "learns" from its history. The effectiveness measurements for all minimally effective ads are saved and used in determining the distribution to be used in the next experiment, as shown by steps 472-480-490. In an alternative embodiment, a weighting scheme may be used to derive the distribution in the next experiment. In this manner, the experiments may be repeated continuously either for segments or for content-based categories on web portals. For example, a health care website that medical doctors are likely to visit may receive advertisements.

In one embodiment the optimal ad replaces the existing advertisement. In an alternative embodiment, the optimal advertisement does not immediately replace the current ad, but the tested ads are propagated to the webpage in proportion to their effectiveness measurement.

In a further embodiment, a cost function may be associated with each ad and the analysis of effectiveness performed with cognizance of such costs. An example in which costs vary is the case in which ad space is being purchased on the webpage or website of an unrelated party, and the cost thereof varies with ad size and placement. The cost may be used to obtain, for example, expected profit associated with each ad format.

If the population is segmented, an optimal advertisement may be determined for each group, and the webserver may be programmed to offer the different optimal advertisements to visitors based upon segmentation.

The measured effectiveness of the sampled advertisements is presented to the user at 460. In addition, the confidence intervals may be calculated and displayed. Methodologies for calculating confidence intervals are known to those skilled in the art.

In one embodiment, the inventive system is programmed to automatically delete a particularly ineffective advertisement. In this case, if the measured effectiveness of an advertisement does not meet a minimum threshold at 470, it is deleted from the advertisements to be shown at step 475.

The advertisements that are propagated from the experiment to the visitors may be conditioned on supplemental variables, such as length of time a visitor spends visiting the site, the number of items purchased, total value of items purchased, prior purchasing history and seasonality.

Consider a specific example of an optimal advertisement calculated by the inventive system. In this example, the experiment is being run for a set of 5 ads for the first time. Therefore, at step 410, the system sets up for a uniform distribution of the advertisements. It is estimated in this example that the website receives 100,000 visitors a day. In this case, the five ads—Ad A, Ad B, Ad C, Ad D and Ad E are input into the system. The objective in this example is to maximize the click-through rate, and the minimum effectiveness threshold is 1%.

A manager for the Internet merchant estimates that 100,000 people visit the website in a day. This estimate may be made used internal data or from historical data, for example. Therefore, of the 100,000 visitors that visit the website, the dynamic sampling engine will randomly pick out 20,000 to receive each of the stock ads in this example, as there is no prior knowledge about the effectiveness of the ads.

Table 1 illustrates the results of the first iteration of an experiment conducted using the inventive system

TABLE 1

| Ad | Prior Distribution | Click rate (%) | Posterior Distribution |
|---|---|---|---|
| A | 0.200 | 0.300 | 0.125 |
| B | 0.200 | 0.250 | 0.104 |
| C | 0.200 | 0.800 | 0.333 |
| D | 0.200 | 0.650 | 0.270 |
| E | 0.200 | 0.400 | 0.271 |

In this example, every ad met the minimum threshold of 0.001, and therefore none are dropped. Ad C is determined to be the most effective ad and may now be distributed to every visitor that visits the website.

In the next iteration, the system may perform more limited sampling using this distribution data. For example, in the next iteration, the system may conduct the experiment on only 5% of the population, while Ad C is presented to the remaining population. The ads may be presented to the sample visitors according to their posterior distribution in the prior experiment, or may be uniformly distributed. The next iteration may or may not include experiments on Ad C, which is now the currently displayed ad. New click-rates are determined, and a new posterior distribution is calculated for the next iteration. In this manner, ineffective ads are not wasted on visitors through excessive experimentation.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An apparatus for determining a currently optimal advertisement for an Internet Merchant website through controlled experimentation, the apparatus comprising:
   (1) an eCommerce system; the eCommerce system comprising:
      (a) a webserver;
      (b) an application server configured to perform business logic; and
      (c) a manager console; and
   (2) a dynamic advertising system; the dynamic advertising system comprising:
      (a) a server module, the server module comprising:
         (i) a dynamic sampling engine; and
         (ii) a logic module;
   wherein, during an experiment, the eCommerce system and the dynamic advertising system are configured to:
      (a) receive input experimental parameters at the manager console to configure the experiment, wherein the input experimental parameters comprise a sampling strategy;
      (b) receive the input experimental parameters at the dynamic sampling engine, wherein the dynamic sampling engine produces and outputs a plurality of experimental advertisements according to the input experimental parameters;
      (c) respond to web page requests received at the webserver from customers by passing a sample of the web page requests through the application server to the dynamic sampling engine according to the input experimental parameters, wherein the dynamic sampling engine samples via the webserver randomly distributing web pages comprising the plurality of experimental advertisements, one of the plurality of experimental advertisements being output per received user web page request in the sample of the web page requests;
      (d) utilize the logic module to determine a quantifiable interest for each of the plurality of experimental advertisements; and
      (e) utilize the logic module to determine a currently optimal advertisement from the plurality of experimental advertisements via an objective function;
   wherein, at the conclusion of the experiment, the currently optimal advertisement is returned as a default advertisement in response to subsequent customer web page requests.

2. The apparatus according to claim 1, wherein the quantifiable interest comprises a click-through rate; and wherein the sampling strategy comprises different forms and formats of an advertisement to be included in the plurality of experimental advertisements.

3. The apparatus according to claim 1, wherein the currently optimal advertisement optimizes a buy-rate.

4. The apparatus according to claim 1, wherein the currently optimal advertisement optimizes a combination of a click-through rate and a buy-rate; and wherein, the currently optimal advertisement is determined by the logic module using a weighted formula.

5. The apparatus according to claim 1, wherein, at the conclusion of the experiment, the currently optimal advertisement is returned as a default advertisement in response to subsequent customer web page requests only if a minimum threshold is achieved, wherein the minimum threshold is a predetermined percentage better than a current default advertisement.

6. The apparatus according to claim 1, wherein the web page requests received at the webserver from the customers are grouped according to at least one variable, the at least one variable being selected from: income group, zip code, profession, and buying history; and wherein the experiment is performed on only one group.

7. The apparatus according to claim 1, wherein the web page requests received at the webserver from the customers are grouped according to at least one variable, the at least one variable being selected from: income group, zip code, profession, and buying history; and wherein the experiment is run on all groups.

8. The apparatus according to claim 7, wherein each group receives a different plurality of experimental advertisements.

9. The apparatus according to claim 7, wherein, at the conclusion of the experiment, a currently optimal advertisement for a group is returned as a default advertisement in response to subsequent customer web page requests from customers similarly grouped.

10. A method for determining a currently optimal advertisement for an Internet merchant website through controlled experimentation, the method comprising:
   (1) conducting an experiment to determine a currently optimal advertisement, the experiment comprising:
      (a) receiving input experimental parameters at a manager console to configure an experiment, wherein the input experimental parameters comprise a sampling strategy;
      (b) receiving the input experimental parameters at a dynamic sampling engine, wherein the dynamic sampling engine produces and outputs a plurality of experimental advertisements according to the input experimental parameters;
      (c) responding to web page requests received at a webserver from customers by passing a sample of the web page requests through an application server to the dynamic sampling engine according to the input experimental parameters, wherein the dynamic sampling engine samples via the web server randomly distributing web pages comprising the plurality of experimental advertisements, one of the plurality of experimental advertisements being output per received user web page request in the sample of requests;
      (d) utilizing a logic module to determine a quantifiable interest for each of the plurality of experimental advertisements; and
      (e) utilizing the logic module to determine the currently optimal advertisement from the plurality of experimental advertisements via an objective function; and
   (2) utilizing the currently optimal advertisement determined in (1) as a default advertisement, wherein, at the conclusion of the experiment, the currently optimal advertisement is returned as the default advertisement in response to subsequent customer web page requests.

11. The method according to claim 10, wherein the quantifiable interest comprises a click-through rate.

12. The method according to claim 10, wherein the currently optimal advertisement optimizes a buy-rate.

13. The method according to claim 10, wherein the currently optimal advertisement optimizes a combination of a click-through rate and a buy-rate; and wherein, the currently optimal advertisement is determined by the logic module using a weighted formula.

14. The method according to claim 10, wherein, at the conclusion of the experiment, the currently optimal advertisement is returned as a default advertisement in response to subsequent customer web page requests only if a minimum threshold is achieved, wherein the minimum threshold is a predetermined percentage better than a current default advertisement.

15. The method according to claim 10, wherein the web page requests received at the webserver from the customers are grouped according to at least one variable, the at least one variable being selected from: income group, zip code, profession, and buying history; and wherein experiment is performed only on one group.

16. The method according to claim 10, wherein the web page requests received at the webserver from the customers are grouped according to at least one variable, the at least one variable being selected from: income group, zip code, profession, and buying history; and wherein the experiment is run on all groups.

17. The method according to claim 16, wherein each group receives a different plurality of experimental advertisements.

18. The method according to claim 16, wherein, at the conclusion of the experiment, a currently optimal advertisement for a group is returned as a default advertisement in response to subsequent customer web page requests from customers similarly grouped.

19. The method according to claim 10, wherein an Internet Merchant employee with manager level access can conduct and monitor the experiment via the manager console; and wherein the web page requests received at a webserver from customers are requests for the Internet merchant website.

20. The method according to claim 10, wherein the (1) conducting an experiment to determine a currently optimal advertisement step further comprises:

First performing steps (a)-(e); and

Thereafter reiterating steps (a)-(e) with a smaller sample of web page requests.

* * * * *